H. M. BURDICK.
Hay Tedder.
No. 95,647.  Patented Oct. 12, 1869.
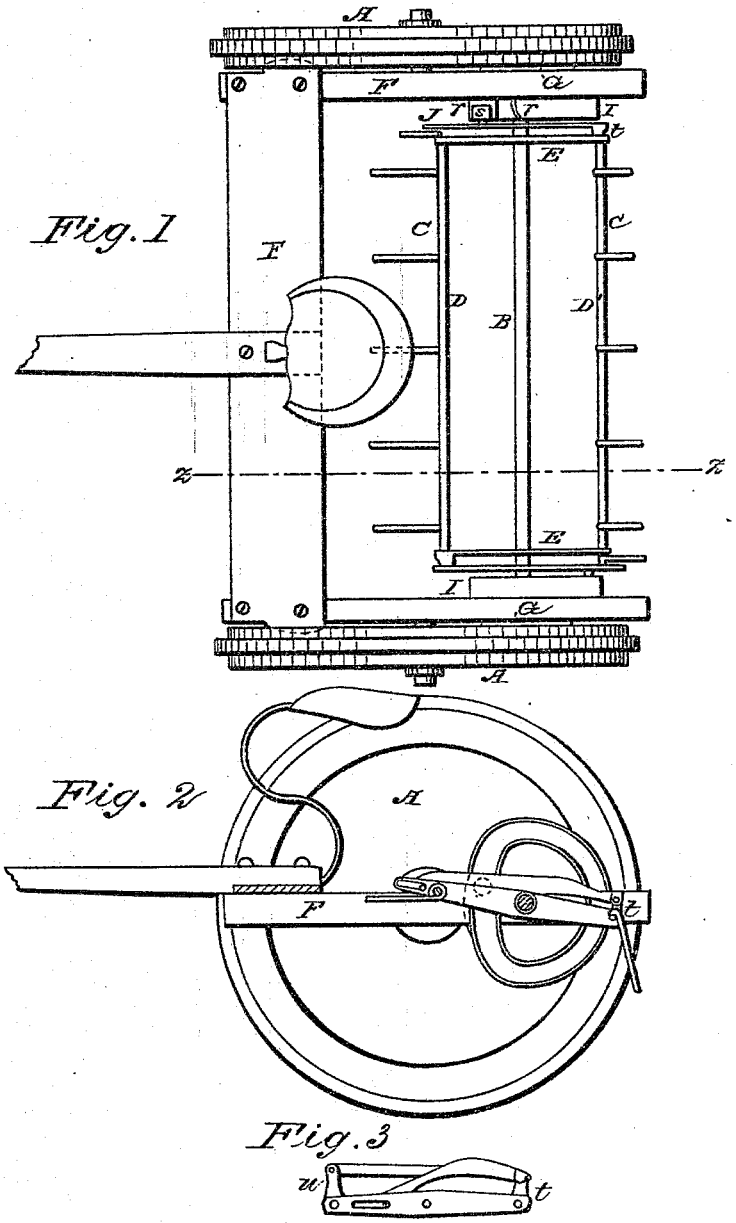
Witnesses  Inventor

United States Patent Office.

HIRAM M. BURDICK, OF ILION, NEW YORK.

Letters Patent No. 95,647, dated October 12, 1869; antedated May 19, 1869.

HAY-TEDDER.

The Schedule referred to in these Letters Patent and making part of the same.

*To all whom it may concern:*

Be it known that I, HIRAM M. BURDICK, of Ilion, Herkimer county, in the State of New York, have invented certain new and useful Improvements in Hay-Tedders; and I hereby declare the following to be a full and exact description thereof, reference being had to the accompanying drawings, forming part of this specification.

The nature or essence of my invention consists in providing, for a hay-tedder, or grass-spreader, a curved guide or cam, consisting of an outer and an inner flange, between which runs a roller, attached to a traversing bar, which operates a crank fixed upon the end of the fork-rod, to give it the proper motion for clearing the forks of grass.

In the drawings, hereinbefore mentioned—

Figure 1 is a plan or top view of my machine.

Figure 2 is a sectional elevation on the line z z of fig. 1.

In these drawings,

F is a frame, to which the pole or shafts and the driver's seat are connected, and upon which the wheels A are pivoted.

B is the shaft of the tedder-reel.

C C, the forks, fastened upon the rods D and D', which turn in the arms E, fixed upon the shaft B.

The shaft B turns in boxes on the frame F, being operated by the friction-wheels G, upon its ends, which are turned by contact with flanges projecting from the wheels A.

On the inner side of the arm H, of the frame F, is secured a disk, I, of cast-iron, or other suitable material, provided with two flanges, r, one within the other, between which runs the roller s, turning on a pin or pivot in the connecting-rod or bar J, which has one of its ends pivoted to a short crank, t, fasteded upon the end of the fork-rod D, the other end being held by a pin traversing in a slot in an extension of the arm E; or the slot may be formed in the arm E, between the rod D and the shaft B, or this end of the bar J may be held by a loose crank, u, both which modifications are shown in Figure 3.

The flanges r are so shaped and arranged as to be considerably nearer to the shaft B on the forward side, and when the roller s reaches that part, the bar J is thrown back, and, by means of the crank t, turns the rod D, so as to give the forks C the position shown in the rear, whereby they readily clear themselves of grass while in the act of rising.

After passing this part of the flanges or cam, the roller s is again thrown out from the shaft B, and the bar J, crank t, and forks C are returned to their former position.

A precisely similar device is arranged at the other end of the reel, to operate in the same way the fork-rod D'.

In combination with the rocking fork-rod D, I claim the continuous double-flanged cam r, roller s, bar J, and crank t, constructed and arranged to operate substantially as described, for the purpose set forth.

HIRAM M. BURDICK.

Witnesses:
J. B. PELTON,
R. R. BENNETT.